United States Patent [19]
Warinner

[11] Patent Number: 5,795,158
[45] Date of Patent: Aug. 18, 1998

[54] APPARATUS TO REVIEW CLINICAL MICROBIOLOGY

[76] Inventor: Peter Warinner, P.O. Box 470, Freeport, N.Y. 11520

[21] Appl. No.: 759,055

[22] Filed: Dec. 2, 1996

[51] Int. Cl.$^6$ .................................................. G09B 19/00
[52] U.S. Cl. ............................................ 434/295; 434/430
[58] Field of Search ............................ 434/295, 88, 296, 434/430

[56] References Cited

U.S. PATENT DOCUMENTS

| | | | |
|---|---|---|---|
| 1,602,356 | 10/1926 | Franz | 434/88 |
| 2,258,603 | 10/1941 | Forbell | 434/88 |
| 2,352,182 | 6/1944 | Brown | 434/295 |
| 2,931,095 | 4/1960 | Keeler | 434/88 |
| 3,594,928 | 7/1971 | Noel | 434/295 |
| 3,629,960 | 12/1971 | Roush | 434/430 |
| 4,089,125 | 5/1978 | Enz et al. | |
| 4,270,284 | 6/1981 | Skellings | |
| 4,461,619 | 7/1984 | Hendry et al. | |
| 4,552,536 | 11/1985 | Kay et al. | |
| 4,606,554 | 8/1986 | Croerman | 434/88 |
| 5,176,519 | 1/1993 | Matiachi et al. | 434/295 |
| 5,178,544 | 1/1993 | Aleck | 434/430 |
| 5,219,289 | 6/1993 | Derr | |
| 5,480,308 | 1/1996 | Boundy et al. | 434/296 |

*Primary Examiner*—Paul J. Hirsch
*Attorney, Agent, or Firm*—Michael I. Kroll

[57] ABSTRACT

The present invention relates to an apparatus to learn or to review clinical microbiology and infectious diseases by incorporating several concepts. In particular, the concept of organization by a logical color-coding system, whereby organisms with similar features are represented by the same color; and the concept of presenting each organism's information on one page or less with alternate pages blank, such as for notes or to eliminate distractions; and the concept of each organism's information spread out over two joining facing pages with extra blank space for notes or to eliminate distractions; and the concept that each organism's information is presented in a layout that graphically separates features of a given organism and that the layout is repeated for each organism within a category, section or chapter such that, although the information about a given feature will differ from organism to organism, the information about the feature will be exhibited on the same graphic location on the page for similarly grouped organisms; all together or individually, these concepts greatly facilitate learning and retention of information on microorganisms and infectious diseases. The apparatus to review clinical microbiology (10) further comprises at least one chapter (18) presented within each of the at least one category (14). The apparatus to review clinical microbiology (10) further comprises a cross reference presented at an end of each of the plurality of sections (16). The apparatus to review clinical microbiology (10) further comprises a General Cross Reference (124) presented at the end of the plurality of sections (16).

30 Claims, 15 Drawing Sheets

BACTERIA (112)

TYPE OF BACTERIA
(112A, 112B, 112C, 112D, 112E, 112F, 112G, 112H, 112I, 112J, 112K, 112L, 112M)

SPECIES, GENUS OF BACTERIUM (112AA)
BACTERIUM DISEASES (112AAA)

SPECIES, GENUS OF BACTERIUM (112AB)
BACTERIUM DISEASES (112ABA)

SPECIES, GENUS OF BACTERIUM (112AC-112MZ)
BACTERIUM DISEASES (112ACA-112JDA)

FIG. 1A

VIRUSES (212)

TYPE OF VIRUSES (212A, 212B)

Box 1:
- TYPE OF VIRUS GENOME (214)
- SHAPE OF VIRUS (216)
- ENVELOPE (218)
- FAMILY OF VIRUS (214A)
- GENERA OF VIRUS (214B)
- SPECIES OF VIRUS (214C)

Box 2:
- CLASSIFICATION OF VIRUS (214)
- TYPE OF VIRUS GENOME (216)
- SHAPE OF ENVELOPE (218)
- PARVOVIRUS FAMILY (214AA)
- PARVOVIRUS GENERA (214AB)
- B19 SPECIES (214CA)

Box 3:
- CLASSIFICATION OF VIRUS (214)
- TYPE OF VIRUS GENOME (216)
- SHAPE OF ENVELOPE (218)

Box 4:
- CLASSIFICATION OF VIRUS (214)
- TYPE OF VIRUS GENOME (216)
- SHAPE OF ENVELOPE (218)

Box 5:
- CLASSIFICATION OF VIRUS (214)
- TYPE OF VIRUS GENOME (216)
- SHAPE OF ENVELOPE (218)

Box 6:
- CLASSIFICATION OF VIRUS (214)
- TYPE OF VIRUS GENOME (216)
- SHAPE OF ENVELOPE (218)

FIG. 2A

VIRUS CROSS REFERENCE (212C)

| SPECIAL CHARACTERISTICS OF VIRUS (254) FAMILY OF VIRUS (214A) | SPECIAL CHARACTERISTICS OF VIRUS (254) FAMILY OF VIRUS (214A) | SPECIAL CHARACTERISTICS OF VIRUS (254) FAMILY OF VIRUS (214A) | SPECIAL CHARACTERISTICS OF VIRUS (254) FAMILY OF VIRUS (214A) | SPECIAL CHARACTERISTICS OF VIRUS (254) FAMILY OF VIRUS (214A) | SPECIAL CHARACTERISTICS OF VIRUS (254) FAMILY OF VIRUS (214A) |
|---|---|---|---|---|---|

FIG. 2C

PRIONS (312)

Box 1 (312A):
- non-DNA, non-RNA PROTEIN PARTICLES (312A)
- PRION DISEASES (314)
- PRION PATHOLOGICAL CHANGES (316)
- PRION RESISTANCE (318)
- PRION INFECTION (320)
- PRION DESCRIPTION (322)

Box 2, 3, 4 (each):
- PRION DISEASE NAME (314A)
- DESCRIPTION OF PRION DISEASE (314AA)
- TRANSMISSION OF PRION DISEASE NAME (314AB)
- WARNINGS OF PRION TRANSMISSION DISEASE NAME (314AC)
- DIAGNOSIS OF PRION DISEASE NAME (314AD)
- TREATMENT OF PRION DISEASE NAME (314AE)

FIG. 3

FUNGI (412)

FUNGI CATAGORY (414)
ROUTE OF INFECTION OF FUNGI (416)
ORGANISMS OF FUNGI (412A)
412AA DERMATOPHYTE ORGANISMS OF FUNGI
GENERA OF FUNGI (412B)
SPECIES OF FUNGI (412C)

FUNGI CATAGORY (414)
ROUTE OF INFECTION OF FUNGI (416)
ORGANISMS OF FUNGI (412A)
412AB SUPERFICIAL ORGANISMS OF FUNGI
412B GENERA OF FUNGI
412C SPECIES OF FUNGI

FUNGI CATAGORY (414)
ROUTE OF INFECTION OF FUNGI (416)
ORGANISMS OF FUNGI (412A)
412AB SUPERFICIAL ORGANISMS OF FUNGI
412B GENERA OF FUNGI
412C SPECIES OF FUNGI

FUNGI CATAGORY (414)
ROUTE OF INFECTION OF FUNGI (416)
ORGANISMS OF FUNGI (412A)
412AB SUPERFICIAL ORGANISMS OF FUNGI
412B GENERA OF FUNGI
412C SPECIES OF FUNGI

FIG. 4A

FUNGI CROSS REFERENCE (412D)

- FUNGI CROSS REFERENCE INTRACELLULAR (412DA)
- FUNGI CROSS REFERENCE INDIA INK STAIN (412DB)
- FUNGI CROSS REFERENCE CHLAMYDOSPORES (412DC)
- FUNGI CROSS REFERENCE GERM TUBES (412DD)

- FUNGI CROSS REFERENCE DIMORPHIC (412DE)
- FUNGI CROSS REFERENCE MOLD ONLY (412DF)
- FUNGI CROSS REFERENCE YEAST ONLY (412DG)

- FUNGI CROSS REFERENCE NON-SEPTATED HYOHI (412DH)
- FUNGI CROSS REFERENCE PSEUDO-HYPHI (412DI)

- FUNGI CROSS REFERENCE TOXIN PRODUCING (412DK)

- FUNGI CROSS REFERENCE FOOTBALL-SHAPED CONDIA (412DL)
- FUNGI CROSS REFERENCE DAISY-SHAPED CONDIA (412DM)
- FUNGI CROSS REFERENCE CIGAR-SHAPED YEAST (412DO)
- FUNGI CROSS REFERENCE MULTINUCLEATED YEAST (412DP)
- FUNGI CROSS REFERENCE SHERULE YEAST (412DQ)
- FUNGI CROSS REFERENCE MULTI-BUDDING YEAST (412DR)
- FUNGI CROSS REFERENCE ENCAPSULATED YEAST (412DS)

- FUNGI CROSS REFERENCE ANIMAL RELATED (412DS)
- FUNGI CROSS REFERENCE SKIN TESTS (412DU)

FIG. 4C

512CB TAPEWORM PARASITES

512CBA PORK TAPEWORM
512F GENUS OF PARASITE
512G SPECIES OF PARASITE
512H PARASITE INFECTION
512I PARASITE SYMPYOMS
512J PARASITE LIFE CYCLE
512K PARASITE FOUND IN
512L PARASITE DIAGNOSIS
512M PARASITE TREATMENT

512CBB BEEF TAPEWORM
512F GENUS OF PARASITE
512G SPECIES OF PARASITE
512H PARASITE INFECTION
512I PARASITE SYMPYOMS
512J PARASITE LIFE CYCLE
512K PARASITE FOUND IN
512L PARASITE DIAGNOSIS
512M PARASITE TREATMENT

512CBC FISH TAPEWORM

512CBD HYDATID CYSTS
512F GENUS OF PARASITE
512G SPECIES OF PARASITE
512H PARASITE INFECTION
512I PARASITE SYMPYOMS
512J PARASITE LIFE CYCLE
512K PARASITE FOUND IN
512L PARASITE DIAGNOSIS
512M PARASITE TREATMENT

512CBE TAPEWORM FEATURES
512F GENUS OF PARASITE
512G SPECIES OF PARASITE
512H PARASITE INFECTION
512I PARASITE SYMPYOMS
512J PARASITE LIFE CYCLE
512K PARASITE FOUND IN
512L PARASITE DIAGNOSIS
512M PARASITE TREATMENT

FIG. 5C

512E PARASITES CROSS REFERENCE

| 512EA INTRACELLULAR | 512ED MEGALOBLASTIC ANEMIA | 512EG HUMAN DEAD-END HOST | 512EH SNAIL RELATED | 512EM INHALATION ROUTE | 512EN VECTOR BORNE |
|---|---|---|---|---|---|
| 512F GENUS OF PARASITE | 512F GENUS OF PARASITE | 512F GENUS OF PARASITE | 512F GENUS OF PARASITE | 512F GENUS OF PARASITE | 512F GENUS OF PARASITE |
| 512G SPECIES OF PARASITE | 512G SPECIES OF PARASITE | 512G SPECIES OF PARASITE | 512G SPECIES OF PARASITE | 512G SPECIES OF PARASITE | 512G SPECIES OF PARASITE |
| 512EB TEMPERATURE TROPISM | 512EE INFECT THROUGH SKIN | | 512EI SEAFOOD RELATED | | |
| 512F GENUS OF PARASITE | 512F GENUS OF PARASITE | | 512F GENUS OF PARASITE | | |
| 512G SPECIES OF PARASITE | 512G SPECIES OF PARASITE | | 512G SPECIES OF PARASITE | | |
| 512EC ACID-FAST | 512EF SWIMMING RELATED | | 512EJ COPEPOD RELATED | | |
| 512F GENUS OF PARASITE | 512F GENUS OF PARASITE | | 512F GENUS OF PARASITE | | |
| 512G SPECIES OF PARASITE | 512G SPECIES OF PARASITE | | 512G SPECIES OF PARASITE | | |
| | | | 512EK CAT RELATED | | |
| | | | 512F GENUS OF PARASITE | | |
| | | | 512G SPECIES OF PARASITE | | |
| | | | 512EL DOG RELATED | | |
| | | | 512F GENUS OF PARASITE | | |
| | | | 512G SPECIES OF PARASITE | | |

FIG. 5D

124 GENERAL CROSS REFERENCE

| 124A NORMAL FLORA COMMENSALS | 124B CAUSES OF MENINGITIS | 124C MENINGITIS CSF FINDINGS | 124D NUCHAL SIGNS | 124E MENINGITIS TREATMENT | 124F PNEUMONIA |
|---|---|---|---|---|---|
| 124AA SKIN | 124BA ASEPTIC VIRAL CAUSE OF MENINGITIS | 124CA VIRAL ASEPTIC MENINGITIS CSF FINDINGS | | 124EA VIRAL ASEPTIC MENINGITIS TREATMENT | 124FA COMMUNITY AQUIRED PNEUMONIA |
| 124AB NOSE | 124BB BACTERIAL CAUSE OF MENINGITIS | 124CB BACTERIAL MENINGITIS CSF FINDINGS | | 124EB NEONATAL BACTERIA MENINGITIS TREATMENT | 124FB ATYPICAL INTERSTITIAL PNEUMONIA |
| 124AC MOUTH/THROAT | 124BC NEONATAL CAUSE OF MENINGITIS | 124CC TUBERCULOUS MENINGITIS CSF FINDINGS | | 124EC BACTERIA MENINGITIS TREATMENT | 124FC IMMUNOCOMPROMISED PNEUMONIA |
| 124AD TEETH/GINGIVA | 124BD IMMUNOCOMPROMISED CAUSE OF MENINGITIS | 124CD CRYPTOCOCCUS MENINGITIS CSF FINDINGS | | 124ED MENINGITIS PROPHYLAXIS | 124FD AIDS PNEUMONIA |
| 124AE STOMACHE | 124BE ELDERLY CAUSE OF MENINGITIS | 124CE SYPHILIS MENINGITIS CSF FINDINGS | | 124EE MENINGITIS PREVENTION | 124FE CYCTIC FIBROSIS PNEUMONIA |
| 124AF INTESTINES | 124BF HEAD TRAUMA/ SURGERY CAUSE OF MENINGITIS | 124CF LYME DISEASE MENINGITIS CSF FINDINGS | | | |
| 124AG VAGINA | 124BG CHRONIC MENINGITIS CAUSE OF MENINGITIS | | | | |

FIG. 6

126 INDEX AND LIST OF ABBREVIATIONS

112: BACTERIA

- 112A - Gram Positive Cocci
- 112AA - Staphylococcus aureus
- 112AAA - Staphylococcus aureus disease
- 112AB - Staphylococcus epidermidis
- 112ABA - Staphylococcus epidermidis disease
- 112AC - Staphylococcus saprophyticus
- 112ACA - Staphylococcus saprophyticus disease
- 112AD - Staphylococcus Group A
- 112ADA - Staphylococcus Group A disease
- 112AE - Staphylococcus Group B
- 112AEA - Staphylococcus Group B disease
- 112AF - Staphylococcus pneumoniae
- 112AFA - Staphylococcus pneumoniae disease
- 112AG - Staphylococcus Group D
- 112AGA - Staphylococcus Group D disease
- 112AH - Staphylococcus Viridans Group
- 112AHA - Staphylococcus Viridans Group disease
- 112AI - Enterococcus spp
- 112AIA - Enterococcus spp disease
- 112B - Positive Rods and Non-Communal Anaerobes
- 112BA - Bacillus Cereus
- 112BAA - Bacillus Cereus disease
- 112BB - Corynebacterium Diphtheria
- 112BBA - Corynebacterium Diphtheria disease
- 112BC - Listeria Monocytogenes
- 112BCA - Listeria Monocytogenes disease
- 112BD - Clostridium Botulinum
- 112BDA - Clostridium Botulinum disease
- 112BE - Clostridium Difficile
- 112BEA - Clostridium Difficile disease
- 112BF - Clostridium Perfringens
- 112BFA - Clostridium Perfringens disease
- 112BG - Clostridium Tetani
- 112BGA - Clostridium Tetani disease
- 112C - Gram Negative Cocci
- 112CA - Neisseria gonorrhoeae
- 112CAA - Neisseria gonorrhoeae disease
- 112CB - Neisseria meningitidis
- 112CBA - Neisseria meningitidis disease
- 112CC - Neisseria catarrhalis
- 112CCA - Neisseria catarrhalis disease
- 112D - Gram Negative Rods Respiratory Related
- 112DA - Gram Negative Rods Urinary Tract Related
- 112F - Gram Negative Rods Gastro-Intestinal Tract Related
- 112G - Zoonotic
- 112H - Vector-Borne Bacteria
- 112I - Commensal Anaerobic Bacteria
- 112J - Gram Positive Acid-Fast and Modified Acid-Fast Bacteria
- 112JA - Tuberculoide Bacterium
- 112JAB - Mycobacterium tuberculosis
- 112JAB - Mycobacterium bovis
- 112JB - Non-Tuberculoide Bacterium
- 112JBA - Mycobacterium marinum
- 112JBB - Mycobacterium scrofulaceum
- 112JBC - MAC
- 112JBD - Mycobacterium smegmatis
- 112JBF - Mycobacterium ulcerans
- 112JBG - Mycobacterium chelonei
- 112JBH - Mycobacterium fortuitum
- 112JC - Modified Acid-Fast Bacterium
- 112JCA - Nocardia asteroides
- 112JD - Leprosy Bacterium
- 112JDA - Mycobacterium leprae
- 112K - Spirochetes
- 112L - Chlamydia
- 112M - Mycoplasma and Ureoplasma
- 112N - Bacteria and Cross Reference

212: VIRUSES
- 212A - DNA Viruses
- 212B - RNA Viruses
- 212C - Viruses Cross Reference
- 214 - classification of virus
- 214A - family of virus
- 214AA - parvovirus family
- 214B - genus of virus
- 214C - parvovirus genus
- 214CA - B19 species
- 216 - type of virus genome
- 216A - single stranded linear DNA
- 216B - double stranded linear DNA
- 216C - double stranded circular DNA
- 216D - partial double stranded circular DNA
- 218 - shape of virus
- 220 - envelope
- 222 - location of replication
- 224 - effect on host cell
- 226 - symbol form
- 228 - pathogenesis
- 230 - disease of virus
- 232 - transmission of virus
- 234 - geographic range of virus
- 236 - diagnosis of virus
- 238 - treatment of virus
- 240 - immunity of virus
- 242 - prevention of virus
- 244 - reagent
- 248 - miscellaneous
- 250 - note
- 252 - unique effect on host cell
- 254 - special characteristic of virus

312: Prions
- 312A - non-DNA non-RNA Protein particle
- 314 - prion disease
- 314AA - description of prion disease name
- 314AB - transmission of prion disease name
- 314AC - treatment of prion disease name
- 314AD - diagnosis of prion disease name
- 316 - prion pathological changes
- 318 - prion resistance
- 320 - prion infection
- 322 - prion description

412: Fungi
- 412A - organisms of fungi
- 412AA - dermatophyte organisms of fungi
- 412AB - superficial organisms of fungi
- 412AC - mucormycetes organisms of fungi
- 412B - genera of fungi
- 412C - species of fungi
- 412D - Fungi Cross Reference
- 412DA - Fungi Cross Reference intracellular
- 412DB - Fungi Cross Reference India Ink Stain
- 412DC - Fungi Cross Reference chlamydospore
- 412DD - Fungi Cross Reference germ tubes
- 412DE - Fungi Cross Reference dimorphic
- 412DF - Fungi Cross Reference mold only
- 412DG - Fungi Cross Reference yeast only
- 412DH - Fungi Cross Reference mite-septated hyphal
- 412DI - Fungi Cross Reference pseudo-hyphae
- 412DJ - Fungi Cross Reference chlamydospores with producing
- 412DK - Fungi Cross Reference yeast with producing
- 412DL - Fungi Cross Reference football-shape conidia
- 412DM - Fungi Cross Reference daisy-shaped conidia
- 412DN - Fungi Cross Reference cigar-shaped yeast
- 412DO - Fungi Cross Reference Infect Through Skin
- 412DP - Fungi Cross Reference multinucleated yeast
- 412DQ - Fungi Cross Reference elderly yeast
- 412DR - Fungi Cross Reference multi-budding yeast
- 412DS - Fungi Cross Reference encapsulated yeast
- 412DT - Fungi Cross Reference sites near yeast
- 414 - fungi category
- 416 - route of infections of fungi
- 418 - disease of fungi
- 420 - transmission of fungi
- 422 - diagnosis of fungi
- 424 - treatment of fungi
- 426 - warning of fungi

512: PARASITES
- 512A - Protozoa parasites
- 512AA - Amoeba parasites
- 512AB - Sporozoasis parasites
- 512AC - Flagellates parasites
- 512AD - Pneumocystis parasites
- 512B - Helminths parasites
- 512C - Flatworm parasites
- 512CA - Fluke parasites
- 512CAA - Schistosomiasis
- 512CAB - Liver Fluke
- 512CAC - Lung Fluke
- 512CAD - Fluke Genital
- 512CB - Tapeworm parasites
- 512CBA - Beef Tapeworm
- 512CBB - Pork Tapeworm
- 512CBC - Fish Tapeworm
- 512CBD - Hydatid Cyst
- 512CBE - Tapeworm Feature
- 512D - Roundworm parasites
- 512DA - Intestinal Nematodes
- 512DB - Extraintestinal Larvae
- 512DC - Tissue Nematodes
- 512E - Parasites Cross Reference
- 512EA - Intercellular
- 512EB - Temperate Tropics
- 512EC - Acid-Fast
- 512ED - Megaloblastic Anemia
- 512EE - Infect Through Skin
- 512EF - Swimming-Related
- 512EG - Human Dead-End Host
- 512EH - Sushi-Related
- 512EI - Seafood-Related
- 512EJ - Coryegrad-Related
- 512EK - Cat-Related
- 512EL - Dog-Related
- 512EM - Skeletal Route
- 512EN - Vector Borne
- 512F - Genus of Parasite
- 512G - Species of Parasite
- 512H - parasites infection
- 512I - parasites symptoms
- 512J - parasites Life Cycle
- 512K - parasites found in
- 512L - parasites diagnosis
- 512M - parasites treatment

122: CROSS REFERENCE
- 122 - GENERAL CROSS REFERENCE
- 124A - Normal Flora Commensals
- 124AA - Skin
- 124AB - Nose
- 124AC - Mouth/Throat
- 124AD - Teeth/Gingiva
- 124AE - Stomach
- 124AF - Intestine
- 124AG - Vagina
- 124B - Causes of Meningitis
- 124BA - Aseptic Viral Cause of Meningitis
- 124BB - Bacterial Cause of Meningitis
- 124BC - Neonatal Cause of Meningitis
- 124BD - Immunocompromised Causes of Meningitis
- 124BE - Elderly Causes of Meningitis
- 124BF - Head Trauma/Surgery Cause of Meningitis
- 124BG - Chronic Meningitis Cause of Meningitis
- 124C - Meningitis CSF Findings
- 124CA - Viral Aseptic Meningitis CSF Findings
- 124CB - Bacterial Meningitis CSF Findings
- 124CC - Tuberculous Meningitis CSF Findings
- 124CD - Cryptococcus Meningitis CSF Findings
- 124CE - Syphilis Meningitis CSF Findings
- 124CF - Lyme Disease Meningitis CSF Findings
- 124D - Nuchal Signs
- 124E - Meningitis Treatment
- 124EA - Viral Aseptic Meningitis Treatment
- 124EB - Neonatal Bacteria Meningitis Treatment
- 124EC - Bacteria Meningitis Treatment
- 124ED - Meningitis Prophylaxis
- 124EE - Meningitis Prevention
- 124F - Pneumonia
- 124FA - Community Acquired Pneumonia
- 124FB - Atypical Interstitial Pneumonia
- 124FC - Immunocompromised Pneumonia
- 124FD - AIDS Pneumonia
- 124FE - Cystic Fibrosis Pneumonia
- 126 - INDEX AND LIST OF ABBREVIATIONS

FIG. 7

APPARATUS TO REVIEW CLINICAL MICROBIOLOGY

BACKGROUND OF THE INVENTION

1. Field of the Invention

The present invention relates to an apparatus to review clinical microbiology. More particularly, the present invention relates to an apparatus to review clinical microbiology which has written pages. Each organism is presented on one page or less; organisms are classified by a color code; organisms are further categorized by disease states they cause; features are presented in a logical graphical layout on each page and the layout is consistent from page to page and organism to organism for each organism within a category or section (features such as treatment or gram stain); every other page is blank for notes. In the alternative, it may present a portion of the layout for one microorganism on one page with a portion of that same page left blank, and the remaining portion of the layout on the joining page of that same joining page left blank. A plurality of sections is presented on the written pages, at least one category is presented within each of the plurality of sections, at least one chapter is presented within each of the at least one category, a cross reference is presented at an end of each of the plurality of sections, and a General Cross Reference is presented at the end of the plurality of sections.

2. Description of the Prior Art

Until the present invention, clinical microbiology books were arranged in standard chapters which microorganisms therein. Each microorganism was arranged either by genus and species and/or by special characteristics such as diagnostic tests. The present invention differs from all other clinical microbiology books because each organism is presented on one page or less; organisms are classified by a color code; organisms are further categorized by disease states they cause; features are presented in a logical graphical layout on each page and the layout is consistent from page to page and organism to organism for each organism within a category or section (features such as treatment or gram stain); every other page is blank for notes. In the alternative, it may present a portion of the layout for one microorganism on one page with a portion of that same page left blank, and the remaining portion of the layout on the joining page of that same joining page left blank.

Numerous innovations for clinical microbiology books are present in the prior art that are adapted to be used. Even though these innovations may be suitable for the specific individual purposes to which they address, they would not be suitable for the purposes of the present invention as heretofore described.

SUMMARY OF THE INVENTION

The present invention relates to an apparatus to review clinical microbiology. More particularly, the present invention relates to an apparatus to review clinical microbiology which has written pages and each organism is presented on one page or less; organisms are classified by a color code; organisms are further categorized by disease states they cause; features are presented in a logical graphical layout on each page and the layout is consistent from page to page and organism to organism for each organism within a category or section (features such as treatment or gram stain); every other page is blank for notes. In the alternative, it may present a portion of the layout for one microorganism on one page with a portion of that same page left blank, and the remaining portion of the layout on the joining page of that same joining page left blank. A plurality of sections is presented on the written pages, at least one category is presented within each of the plurality of sections, at least one chapter is presented within each of the at least one category, a cross reference is presented at an end of each of the plurality of sections, and a General Cross Reference is presented at the end of the plurality of sections.

The types of problems encountered in the prior art are studying clinical microbiology is a tedious task.

In the prior art, unsuccessful attempts to solve this problem were attempted namely: arranging microorganisms into groups according to genus, species and/or special features. However, the problem was solved by the present invention because the present invention relates to an apparatus to learn or to review clinical microbiology and infectious diseases by incorporating several concepts. In particular, the concept of organization by a logical color-coding system, whereby organisms with similar features are represented by the same color; and the concept of presenting each organism's information on one page or less with alternate pages blank, such as for notes or to eliminate distractions; and the concept of each organism's information spread out over two joining facing pages with extra blank space for notes or to eliminate distractions; and the concept that each organism's information is presented in a layout that graphically separates features of a given organism and that the layout is repeated for each organism within a category, section or chapter such that, although the information about a given feature will differ from organism to organism, the information about the feature will be exhibited on the same graphic location on the page for similarly grouped organisms; all together or individually, these concepts greatly facilitate learning and retention of information on microorganisms and infectious diseases.

Innovations within the prior art are rapidly being exploited in the filed of education, especially facilitating the learning and retention process.

The present invention went contrary to the teaching of the art which teaches standard books arranged in chapters.

The present invention solved a long felt need for a concise review book of clinical microbiology which can be utilized as a refresher or to study for an exam.

The present invention produced unexpected results namely: students retained the information associated with each microorganism due to its color coding which correlates visually to features of the organism or correlates to similar organisms.

Accordingly, it is an object of the present invention to provide an apparatus to review clinical microbiology.

More particularly, it is an object of the present invention to provide an apparatus to review clinical microbiology which comprises written pages and each organism is presented on one page or less; organisms are classified by a color code; organisms are further categorized by disease states they cause; features are presented in a logical graphical layout on each page and the layout is consistent from page to page and organism to organism for each organism within a category or section (features such as treatment or gram stain); every other page is blank for notes. In the alternative, it may present a portion of the layout for one microorganism on one page with a portion of that same page left blank, and the remaining portion of the layout on the joining page of that same joining page left blank.

In keeping with these objects, and with others which will become apparent hereinafter, one feature of the present invention resides, briefly stated, in it is arranged in categories.

When the category is designed in accordance with the present invention, it contains at least one section.

In accordance with another feature of the present invention, the at least one section have at least one chapter contained therein.

Another feature of the present invention is that the microorganisms are color coded in correlation to features of the organism or correlates to similar organisms.

The novel features which are considered characteristic for the invention are set forth in the appended claims. The invention itself however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

10—apparatus to review clinical microbiology (10)
12A—written page (12A)
12B—blank page (12B)
14—category (14)
16—section (16)
18—chapter (18)
20—color coding (20)
114—Gram stain (114)
118—oxygen requirement (118)
120—cellular growth (120)
122—features (122)
124—motility (124)
126—capsule & glycocalyx (126)
128—toxins (128)
130—clinical (130)
132—source & transmission (132)
134—virulence factors (134)
136—treatment (136)
138—vaccine and toxoid (138)
140—host defense & immunity (140)
142—lab tests (142)
SECTION I
112—Bacteria (112)
CHAPTER 1
112A—Gram Positive Cocci (112A)
112AA—*Staphylococcus aureus* (112AA)
112AAA—*Staphylococcus aureus* diseases (112AAA)
112AB—*Staphylococcus epidermidis* (112AB)
112ABA—*Staphylococcus epidermidis* diseases (112ABA)
112AC—*Staphylococcus saprophyticus* (112AC)
112ACA—*Staphylococcus saprophyticus* diseases (112ACA)
112AD—Staphylococcus Group A (112AD)
112ADA—Staphylococcus Group A diseases (112ADA)
112AE—Staphylococcus Group B (112AE)
112AEA—Staphylococcus Group B diseases (112AEA)
112AF—*Staphylococcus pneumoniae* (112AF)
112AFA—*Staphylococcus pneumoniae* diseases (112AFA)
112AG—Staphylococcus Group D (112AG)
112AGA—Staphylococcus Group D diseases (112AGA)
112AH—Staphylococcus Viridans Group (112AH)
112AHA—Staphylococcus Viridans Group diseases (112AHA)
112AI—Enterococcus spp (112AI)
112AIA—Enterococcus spp diseases (112AI)
CHAPTER 2
112B—Positive Rods and Non-Commensal Anaerobes (112B)
112BA—Bacillus Cereus (112BA)
112BAA—Bacillus Cereus diseases (112BAA)
112BB—Corynebacterium Diptheriae (112BB)
112BBA—Corynebacterium Diptheriae diseases (112BBA)
112BC—Listeria Monocytogenes (112BC)
112BCA—Listeria Monocytogenes diseases (112BCA)
112BD—Clostridium Botulinum (112BD)
112BDA—Clostridium Botulinum diseases (112BDA)
112BE—Clostridium Difficile (112BE)
112BEA—Clostridium Difficile diseases (112BEA)
112BF—Clostridium Perfringens (112BF)
112BFA—Clostridium Perfringens diseases (112BFA)
112BG—Clostridium Tetani (112BG)
112BGA—Clostridium Tetani diseases (112BGA)
CHAPTER 3
112C—Gram Negative Cocci (112C)
112CA—*Neisseria gonnorrhoeae* (112CA)
112CAA—*Neisseria gonnorrhoeae diseases* (112CAA)
112CB—*Neisseria meningitidis* (112CB)
112CBA—*Neisseria meningitidis* diseases (112CBA)
112CC—*Neisseria catarrhalis* (112CC)
112CCA—*Neisseria catarrhalis* diseases (112CCA)
CHAPTER 4
112D—Gram Negative Rods Respiratory Related (112D)
CHAPTER 5
112E—Gram Negative Rods Urinary Tract Related (112E)
CHAPTER 6
112F—Gram Negative Rods Gastro-Intestinal Tract Related (112F)
CHAPTER 7
112G—Zoonotic Bacteria (112G)
CHAPTER 8
112H—Vector-Borne Bacteria (112H)
CHAPTER 9
112I—Commensal Anaerobic Bacteria (112I)
CHAPTER 10
112J—Gram Positive Acid-Fast and Modified Acid-Fast Bacteria (112J)
112JA—*Tuberculosis Bacterium* (112JA)
112JAA—*Mycobacterium tuberculosis* (112JAA)
112JAB—*Mycobacterium bovis* (112JAB)
112JB—Non-Tuberculosis Bacterium (112JB)
112JBA—*Mycobacterium kansasii* (112JBA)
112JBB—*Mycobacterium marinum* (112JBB)
112JBC—*Mycobacterium scrofulaceum* (112JBC)
112JBD—MAC (112JBD)
112JBE—*Mycobacterium smegmatis* (112JBE)
112JBF—*Mycobacterium abscessus* (112JBF)
112JBG—*Mycobacterium chelonei* (112JBG)
112JBH—*Mycobacterium fortuitum* (112JBH)
112JC—Modified Acid-Fast Bacterium (112JC)
112JCA—*Nocardia asteroides* (112JCA)
112JD—Leprosy Bacterium (112JD)
112JDA—*Mycobacterium leprae* (112JDA)
CHAPTER 11
112K—Spirochetes (112K)
CHAPTER 12
112L—Chlamydia (112L)
CHAPTER 13
112M—Mycoplasma and Ureaplasma (112M)
CHAPTER 14
112N—Bacteria and Cross Reference (112N)
SECTION II
212—Viruses (212)
CHAPTER 15
212A—DNA Viruses (212A)
CHAPTER 16
212B—RNA Viruses (212B)

CHAPTER 18
212C—Virus Cross Reference (212C)
214—classification of virus (214)
214A—family of virus (214A)
214AA—parvovirus family (214AA)
214B—genera of virus (214B)
214BA—parvovirus genera (214BA)
214C—species of virus (214C)
214CA—B19 species (214CA)
216—type of virus genome (216)
216A—single stranded linear DNA (216A)
216B—double stranded linear DNA (216B)
216C—double stranded circular DNA (216C)
216D—partial double stranded circular DNA (216D)
218—shape of envelope (218)
220—envelope (220)
222—location of replication (222)
224—effect on host cell (224)
226—special facts (226) (not shown)
228—pathogenesis (228) (not shown)
230—disease of virus (230)
232—transmission of virus (232)
234—geographic range of virus (234)
236—diagnosis of virus (236)
238—treatment of virus (238)
240—immunity of virus (240)
242—vaccine of virus (242)
244—prevention of virus (244)
246—segmentation (246)
248—neucleocapsid (248)
250—note (250)
252—unique effect on host cell (252) (not shown)
254—special characteristics of virus (254)
CHAPTER 17
312—Prions (312)
312A—non-DNA non-RNA Protein particles (312A)
314—prion diseases (314)
314A—prion disease name (314A)
314AA—description of prion disease name (314AA)
314AB—transmission of prion disease name (314AB)
314AC—warnings of prion disease name (314AC)
314AD—diagnosis of prion disease name (314AD)
314AE—treatment of prion disease name (314AE)
316—prion pathological changes (316)
318—prion resistance (318)
320—prion infection (320)
322—prion description (322)
SECTION III
CHAPTER 19
412—Fungi (412)
412A—organisms of fungi (412A)
412AA—dermatophyte organisms of fungi (412AA)
412AB—superficial organisms of fungi (412AB)
412AC—mucormycosis organisms of fungi (412AC)
412B—genera of fungi (412B)
412C—species of fungi (412C)
CHAPTER 20
412D—Fungi Cross Reference (412D)
412DA—Fungi Cross Reference intracellular (412DA)
412DB—Fungi Cross Reference India Ink Stain (412DB)
412DC—Fungi Cross Reference chlamydospores (412DC)
412DD—Fungi Cross Reference germ tubes (412DD)
412DE—Fungi Cross Reference dimorphic (412DE)
412DF—Fungi Cross Reference mold only (412DF)
412DG—Fungi Cross Reference yeast only (412DG)
412DH—Fungi Cross Reference non-septated hyphi (412DH)
412DI—Fungi Cross Reference pseudo-hyphi (412DI)
412DJ—Fungi Cross Reference chlamydospores (412DJ)
412DK—Fungi Cross Reference toxin producing (412DK)
412DL—Fungi Cross Reference football-shape condia (412DL)
412DM—Fungi Cross Reference daisey-shaped condia (412DM)
412DN—Fungi Cross Reference cigar-shaped yeast (412DN)
412DO—Fungi Cross Reference cigar-shaped yeast (412DO)
412DP—Fungi Cross Reference multinucleated yeast (412DP)
412DQ—Fungi Cross Reference sherule yeast (412DQ)
412DR—Fungi Cross Reference multi-budding yeast (412DR)
412DS—Fungi Cross Reference encapsulated yeast (412DS)
412DT—Fungi Cross Reference animal related (412DS)
412DU—Fungi Cross Reference skin tests (412DU)
414—fungi category (414)
416—route of infection of fungi (416)
418—disease of fungi (418)
420—transmission of fungi (420)
422—diagnosis of fungi (422)
424—treatment of fungi (424)
426—warning of fungi (426)
SECTION IV
CHAPTER 21
512—Parasites (512)
512A—Protozoa parasites (512A)
512AA—Ameba parasites (512AA)
512AB—Sporozoan parasites (512AB)
512AC—Flagellate parasites (512AC)
512AD—Pneumocystis parasites (512AD)
512B—Helminths parasites (512B)
512C—Flatworm parasites (512C)
512CA—Fluke parasites (512CA)
512CAA—Schistosomiasis (512CAA)
512CAB—Liver Fluke (512CAB)
512CAC—Lung Fluke (512CAC)
512CAD—Fluke features (512CAD)
512CB—Tapeworm parasites (512CB)
512CBA—Pork Tapeworm (512CBA)
512CBB—Beef Tapeworm (512CBB)
512CBC—fish Tapeworm (512CBC)
512CBD—Hydatid Cysts (512CBD)
512CBE—Tapeworm Features (512CBE)
512D—Roundworm parasites (512D)
512DA—Intestinal Nematodes (512DA)
512DB—Extraintestinal Larvae (512DB)
512DC—Tissue Nematodes (512DC)
CHAPTER 22
512E—Parasite Cross Reference (512E)
512EA—Intracellular (512EA)
512EB—Temperature Tropism (512EB)
512EC—Acid-Fast (512EC)
512ED—Megaloblastic Anemia (512ED)
512EE—Infect Through Skin (512EE)
512EF—Swimming-Related (512EF)
512EG—Human Dead-End Host (512EG)
512EH—Snail-Related (512EH)
512EI—Seafood-Related (512EI)
512EJ—Copepod-Related (512EJ)
512EK—Cat-Related (512EK)
512EL—Dog-Related (512EL)
512EM—Inhalation Route (512EM)

512EN—Vector-Borne (512EN)
512F—Genus of Parasite (512F)
512G—Species of Parasite (512G)
512H—parasite infection (512H)
512I—parasite symptoms (512I)
512J—parasite Life Cycle (512J)
512K—parasite found in (512K)
512L—parasite diagnosis (512L)
512M—parasite treatment (512M)
SECTION V
CHAPTER 23
124—General Cross Reference (124)
124A—Normal Flora Commensals (124A)
124AA—Skin (124AA)
124AB—Nose (124AB)
124AC—Mouth/Throat (124AC)
124AD—Teeth/Gingiva (124AD)
124AE—Stomach (124AE)
124AF—Intestines (124AF)
11124AG—Vagina (124AG)
124B—Causes of Menningitis (124B)
124BA—Aseptic Viral Cause of Menningitis (124BA)
124BB—Bacterial Cause of Menningitis (124BB)
124BC—Neonatal Cause of Menningitis (124BC)
124BD—Immunocompromised Cause of Menningitis (124BD)
124BE—Elderly Cause of Menningitis (124BE)
124BF—Head Trauma/Surgery Cause of Menningitis (124BF)
124BG—Chronic Meningitis Cause of Menningitis (124BG)
124C—Menningitis CSF Findings (124C)
124CA—Viral Aseptic Menningitis CSF Findings (124CA)
124CB—Bacterial Menningitis CSF Findings (124CB)
124CC—Tuberculous Menningitis CSF Findings (124CC)
124CD—Crtptococcus Menningitis CSF Findings (124CD)
124CE—Syphilis Menningitis CSF Findings (124CE)
124CF—Lyme Disease Menningitis CSF Findings (124CF)
124D—Nuchal Signs (124D)
124E—Menningitis Treatment (124E)
124EA—Viral Aseptic Menningitis Treatment (124EA)
124EB—NeonatalBacteria Menningitis Treatment (124EB)
124EC—Bacteria Menningitis Treatment (124EC)
124ED—Meningitis Prophylaxis (124ED)
124EE—Meningitis Prevention (124EE)
124F—Pneumonia (124F)
124FA—Community Acquired Pneumonia (124FA)
124FB—Atypical interstitial Pneumonia (124FB)
124FC—Immunocompromised Pneumonia (124FC)
124FD—AIDS Pneumonia (124FD)
124FE—Cystic Fibrosis Pneumonia (124FE)
INDEX
126—Index and list of abbreviations (126)

BRIEF DESCRIPTION OF THE DRAWING

FIG. 1A is a written page of Bacteria.
FIG. 2A is a written page of Viruses.
FIG. 2C is a written page of a Virus Cross Reference.
FIG. 3 is a written page of Prions.
FIG. 4A is a written page of Fungi.
FIG. 4C is a written page of Fungi Cross Reference.
FIG. 5C is a written page of Tapeworm parasites.
FIG. 5D is a written page of Parasite Cross Reference.
FIG. 6 is a written page of General Cross Reference.
FIG. 7 is a written page of Index and list of abbreviations.

DESCRIPTION OF THE PREFERRED EMBODIMENT

Figure 1B:
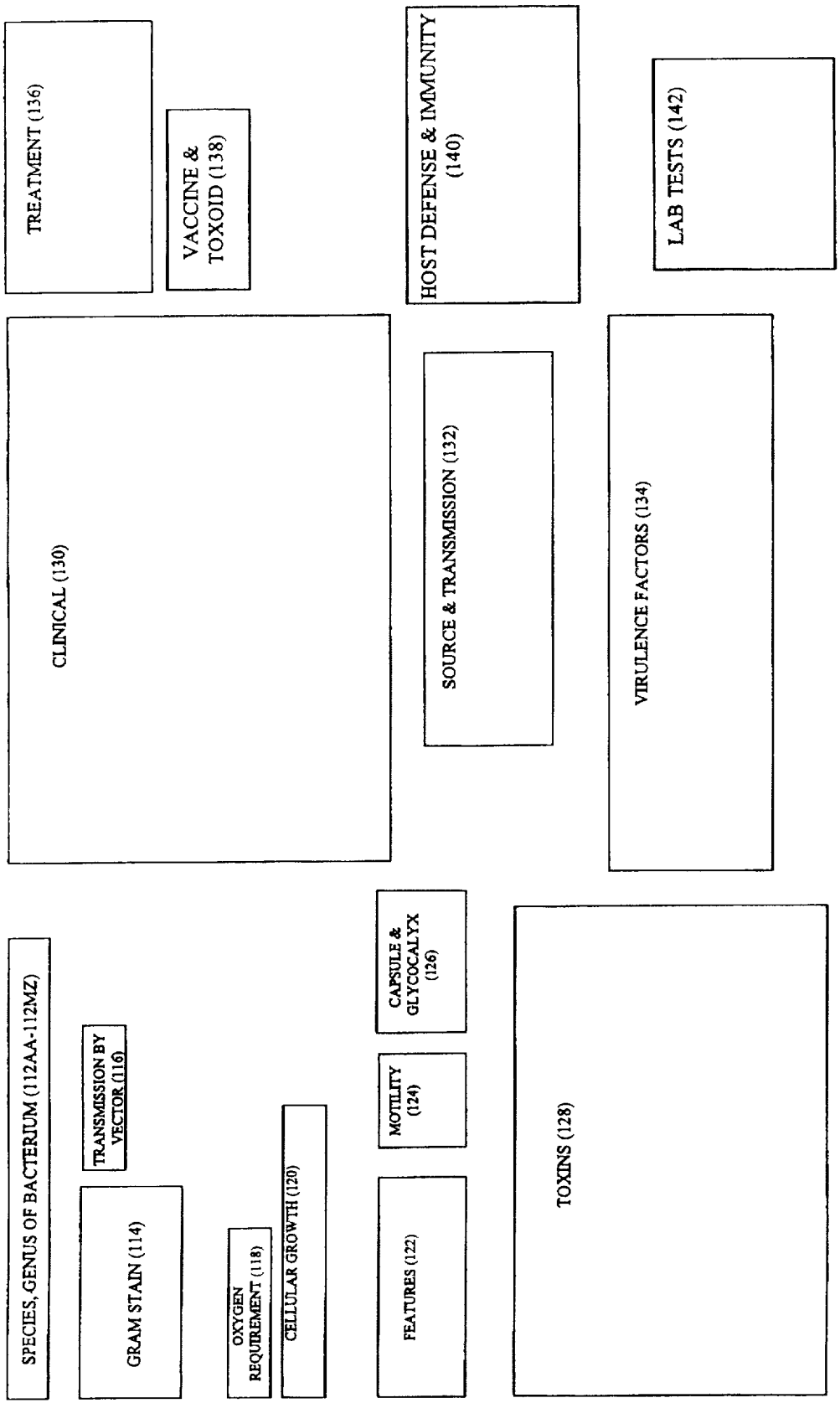
FIG. 1B is a written page of an individual Bacteria arranged by genus and species.

Referring to FIG. 1A which is a written page (12A) of Bacteria (112) exhibiting the such as Gram Positive Cocci (112A), Positive Rods and Non-Commensal Anaerobes (112B), Gram Negative Cocci (112C), Gram Negative Rods Respiratory Related (112D), Gram Negative Rods Urinary Tract Related (112E), Gram Negative Rods Gastro-Intestinal Tract Related (112F), Zoonotic Bacteria (112G), Vector-Borne Bacteria (112H), Commensal Anaerobic Bacteria (112I), Gram Positive Acid-Fast and Modified Acid-Fast Bacteria (112J), Spirochetes (112K), Chlamydia (112L), and Mycoplasma and Ureaplasma (112M). Within the apparatus to review clinical microbiology (10), the types of bacteria are arranged in chapters (18) numbered from 1 through 13, respectively. Upon the same written page (12A) of Bacteria (112) several species and genus of bacterium and associated are displayed such as Staphylococcus aureus (112AA) with associated Staphylococcus aureus diseases (112AAA); Staphylococcus epidermidis (112AB) with associated Staphylococcus epidermidis diseases (112ABA); Staphylococcus saprophyticus (112AC) with associated Staphylococcus saprophyticus diseases (112ACA); Staphylococcus Group A (112AD) with associated Staphylococcus Group A diseases (112ADA); Staphylococcus Group B (112AE) with associated Staphylococcus Group B diseases (112AEA); Staphylococcus pneumoniae (112AF) with associated Staphylococcus pneumoniae diseases (112AFA); Staphylococcus Group D (112AG) with associated Staphylococcus Group D diseases (112AGA); Staphylococcus Viridans Group (112AH) with associated Staphylococcus Viridans Group diseases (112AHA); and Enterococcus spp (112AI) with associated Enterococcus spp diseases (112AI).

Alternatively, a written page (12A) of Bacteria (112) may exhibit Positive Rods and Non-Commensal Anaerobes (112B) such as: Bacillus Cereus (112BA) with associated Bacillus Cereus diseases (112BAA), Corynebacterium Diptheriae (112BB) with associated Corynebacterium Diptheriae diseases (112BBA), Listeria Monocytogenes (112BC) with associated Listeria Monocytogenes diseases (112BCA), Clostridium Botulinum (112BD) with associated Clostridium Botulinum diseases (112BDA), Clostridium Difficile (112BE) with associated Clostridium Difficile diseases (112BEA), Clostridium Perfringens (112BF) with associated Clostridium Perfringens diseases (112BFA), and Clostridium Tetani (112BG) with associated Clostridium Tetani diseases (112BGA).

In addition, a written page (12A) of Bacteria (112) may exhibit Gram Negative Cocci (112C) such as: Neisseria gonnorrhoeae (112CA) with associated Neisseria gonnorrhoeae diseases (112CAA), Neisseria meningitidis (112CB) with associated Neisseria meningitidis diseases (112CBA), Neisseria catarrhalis (112CC) with associated Neisseria catarrhalis diseases (112CCA).

Furthermore, a written page (12A) of Bacteria (112) may exhibit such as: Gram Positive Acid-Fast and Modified Acid-Fast Bacteria (112J), Tuberculosis Bacterium (112JA) with associated: Mycobacterium tuberculosis (112JAA),

*Mycobacterium bovis* (112JAB). Non-Tuberculosis Bacterium (112JB). *Mycobacterium kansasii* (112JBA). *Mycobacterium marinum* (112JBB). *Mycobacterium scrofulaceum* (112JBC). MAC (112JBD). *Mycobacterium smegmatis* (112JBE). *Mycobacterium abscessus* (112JBF). *Mycobacterium chelonei* (112JBG). *Mycobacterium fortuitum* (112JBH). Modified Acid-Fast Bacterium (112JC). *Nocardia asteroides* (112JCA). Leprosy Bacterium (112JD), and *Mycobacterium leprae* (112JDA).

Referring to FIG. 1B which is a written page (12A) of an individual Bacteria (112) arranged by genus and species. The written page (12A) exhibits the following thereon: Gram stain (114), oxygen requirement (118), cellular growth (120), features (122), motility (124), capsule & glycocalyx (126), toxins (128), clinical (130), source & transmission (132), virulence factors (134), treatment (136), vaccine and toxoid (138), host defense & immunity (140), and lab tests (142).

Referring to FIG. 2A which is a written page (12A) of Viruses (212) exhibiting types of viruses such as DNA Viruses (212A) or RNA Viruses (212B) as well as corresponding classification of virus (214), family of virus (214A), parvovirus family (214AA), genera of virus (214B), parvovirus genera (214BA), species of virus (214C), B19 species (214CA), type of virus genome (216), single stranded linear DNA (216A), double stranded linear DNA (216B), double stranded circular DNA (216C), partial double stranded circular DNA (216D), and shape of envelope (218).

Figure 2B:
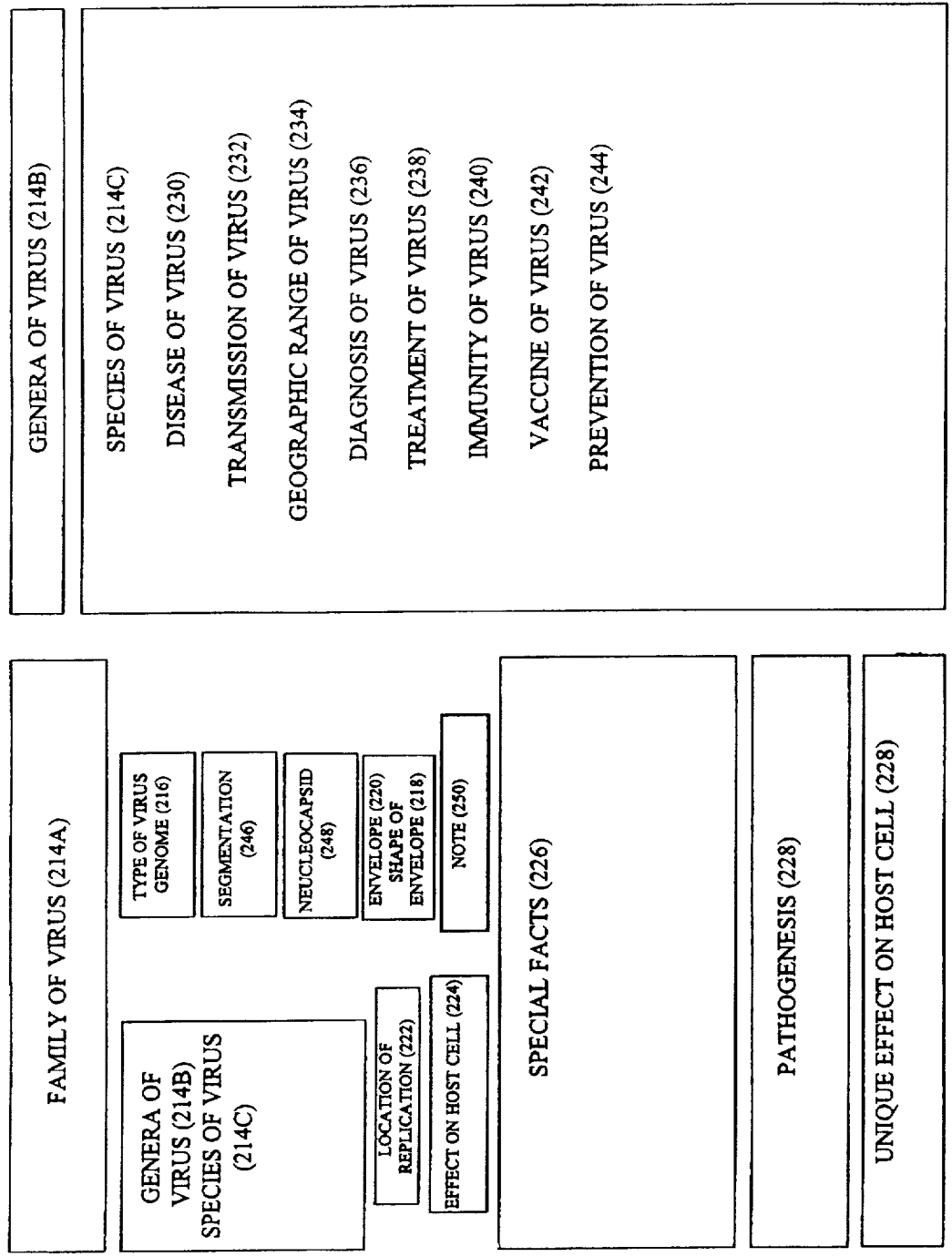
FIG. 2B is a written page of an individual Viruses arranged by family of virus.

Referring to FIG. 2B which is a written page (12A) of an individual Viruses (212) arranged by family of virus (214A) exhibiting: family of virus (214A), genera of virus (214B), species of virus (214C), type of virus genome (216), disease of virus (230), transmission of virus (232), geographic range of virus (234), diagnosis of virus (236), treatment of virus (238), immunity of virus (240), vaccine of virus (242), prevention of virus (244), segmentation (246), and neucleocapsid (248), shape of envelope (218), envelope (220), location of replication (222), effect on host cell (224), note (250), special facts (226) (not shown), pathogenesis (228) (not shown), and unique effect on host cell (252) (not shown).

Referring to FIG. 2C which is a written page (12A) of a Virus Cross Reference (212C) exhibiting special characteristics of virus (254) and family of virus (214A).

Referring to FIG. 3 which is a written page (12A) of Prions (312) exhibiting: non-DNA non-RNA Protein particles (312A), prion diseases (314), prion disease name (314A), description of prion disease name (314AA), transmission of prion disease name (314AB), warnings of prion disease name (314AC), diagnosis of prion disease name (314AD), treatment of prion disease name (314AE), prion pathological changes (316), prion resistance (318), prion infection (320), and prion description (322).

Referring to FIG. 4A which is a written page (12A) of Fungi (412) exhibiting: organisims of fungi (412A), dermatophyte organisims of fungi (412AA), superficial organisims of fungi (412AB), mucormycosis organisims of fungi (412AC), genera of fungi (412B), species of fungi (412C), fungi category (414), and route of infection of fungi (416).

Figure 4B:
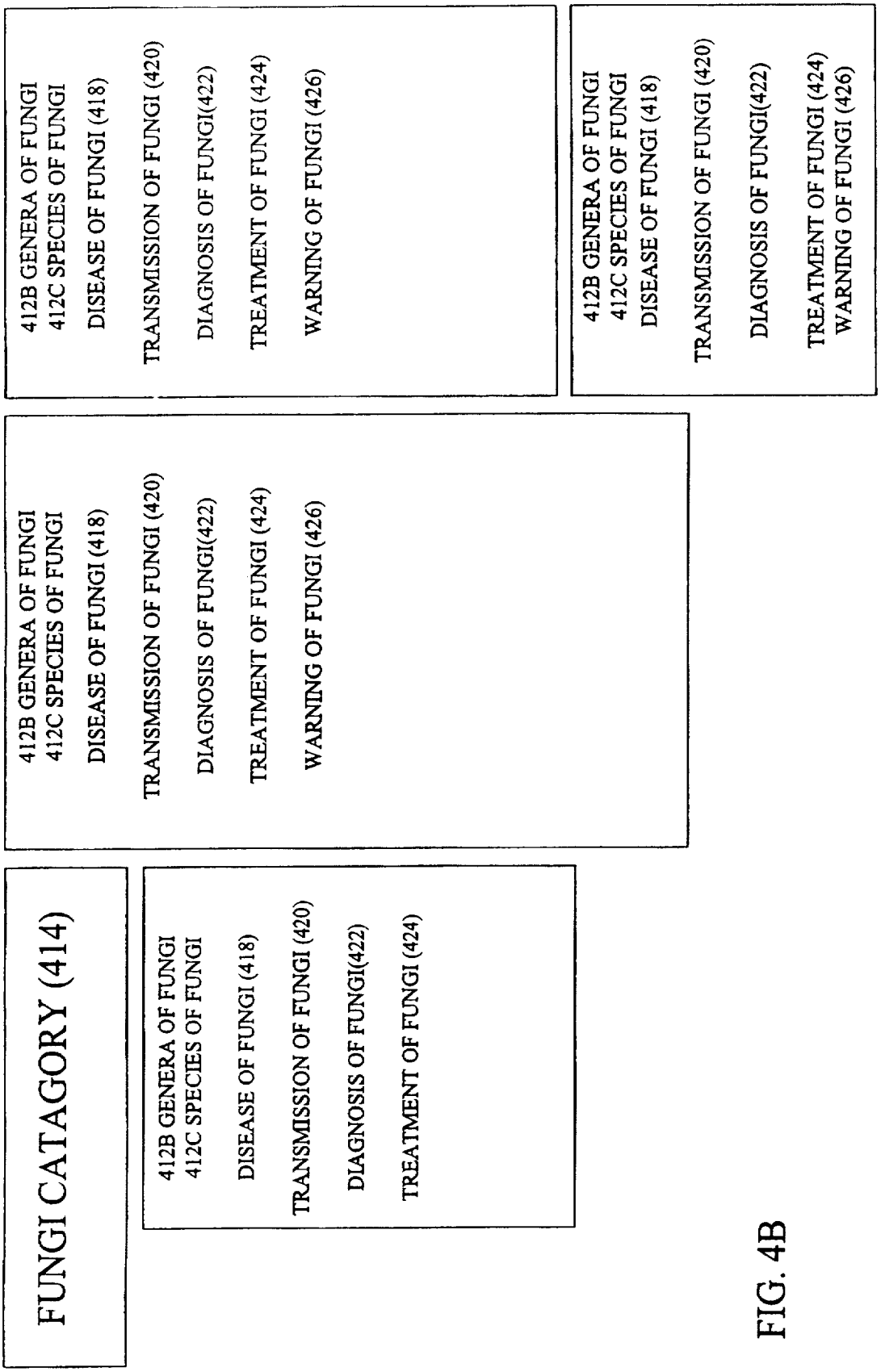
FIG. 4B is a written page of fungi category.

Referring to FIG. 4B which is a written page (12A) of fungi category (414) exhibiting: genera of fungi (412B), species of fungi (412C), disease of fungi (418), transmission of fungi (420), diagnosis of fungi (422), treatment of fungi (424) and warning of fungi (426).

Referring to FIG. 4C which is a written page (12A) of Fungi Cross Reference (412D) exhibiting: Fungi Cross Reference intracellular (412DA), Fungi Cross Reference India Ink Stain (412DB), Fungi Cross Reference chlamydospores (412DC), Fungi Cross Reference germ tubes (412DD), Fungi Cross Reference dimorphic (412DE), Fungi Cross Reference mold only (412DF), Fungi Cross Reference yeast only (412DG), Fungi Cross Reference non-septated hyohi (412DH), Fungi Cross Reference pseudo-hyphi (412DI), Fungi Cross Reference chlamydospores (412DJ), Fungi Cross Reference toxin producing (412DK), Fungi Cross Reference football-shape condia (412DL), Fungi Cross Reference daisey-shaped condia (412DM), Fungi Cross Reference cigar-shaped yeast (412DN), Fungi Cross Reference cigar-shaped yeast (412DO), Fungi Cross Reference multinucleated yeast (412DP), Fungi Cross Reference sherule yeast (412DQ), Fungi Cross Reference multi-budding yeast (412DR), Fungi Cross Reference encapsulated yeast (412DS), Fungi Cross Reference animal related (412DS), and Fungi Cross Reference skin tests (412DU).

Figure 5A:
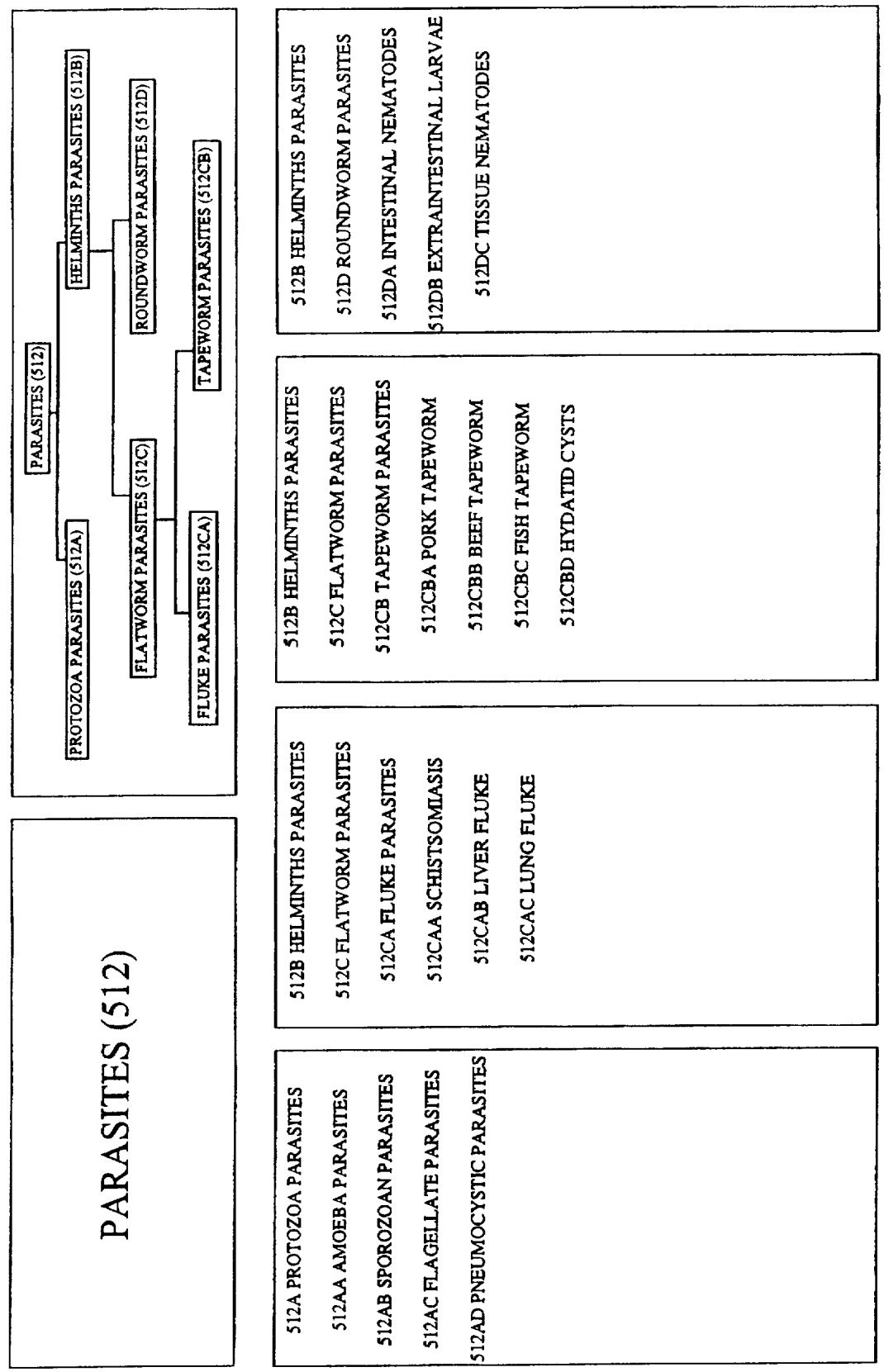
FIG. 5A is a written page of Parasites.

Referring to FIG. 5A which is a written page (12A) of Parasites (512) exhibiting: Protozoa parasites (512A), Ameba parasites (512AA), Sporozoan parasites (512AB), Flagellate parasites (512AC), Pneumocystis parasites (512AD), Helminths parasites (512B), Flatworm parasites (512C), Fluke parasites (512CA), Schistosomiasis (512CAA), Liver Fluke (512CAB), Lung Fluke (512CAC), Fluke features (512CAD), Tapeworm parasites (512CB), Pork Tapeworm (512CBA), Beef Tapeworm (512CBB), fish Tapeworm (512CBC), Hydatid Cysts (512CBD), Tapeworm Features (512CBE), Roundworm parasites (512D), Intestinal Nematodes (512DA), Extraintestinal Larvae (512DB), and Tissue Nematodes (512DC).

Figure 5B:
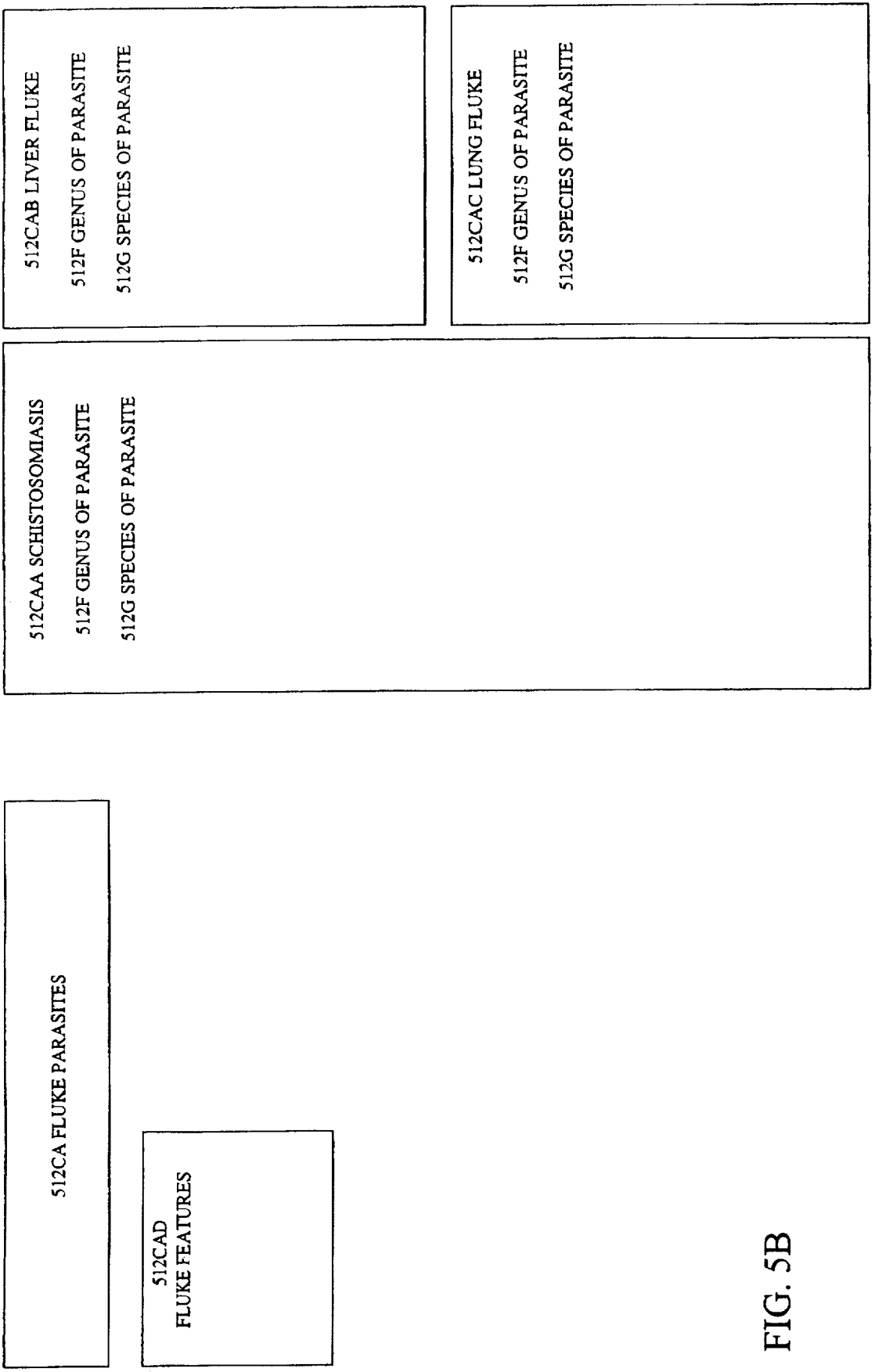
FIG. 5B is a written page of Fluke parasites.

Referring to FIG. 5B which is a written page (12A) of Fluke parasites (512CA) exhibiting: Fluke parasites (512CA), Schistosomiasis (512CAA), Liver Fluke (512CAB), Lung Fluke (512CAC), Fluke features (512CAD), Genus of Parasite (512F), and Species of Parasite (512G).

Referring to FIG. 5C which is a written page (12A) of Tapeworm parasites (512CB) exhibiting Tapeworm parasites (512CB), Pork Tapeworm (512CBA), Beef Tapeworm (512CBB), fish Tapeworm (512CBC), Hydatid Cysts (512CBD), Tapeworm Features (512CBE), Genus of Parasite (512F), Species of Parasite (512G), parasite infection (512H), parasite symptoms (512I), parasite Life Cycle (512J), parasite found in (512K), parasite diagnosis (512L), and parasite treatment (512M).

Referring to FIG. 5D which is a written page (12A) of Parasite Cross Reference (512E) exhibiting Genus of Parasite (512F) and Species of Parasite (512G). Optionally (not shown), each individual Parasite (512) which is a written page (12A) may display a feature selected from a group consisting of Parasite Cross Reference (512E), Intracellular (512EA), Temperature Tropism (512EB), Acid-Fast (512EC), Megaloblastic Anemia (512ED), Infect Through Skin (512EE), Swimming-Related (512EF), Human Dead-End Host (512EG), Snail-Related (512EH), Seafood-Related (512EI), Copepod-Related (512EJ), Cat-Related (512EK), Dog-Related (512EL), Inhalation Route (512EM), and Vector-Borne (512EN).

Referring to FIG. 6 which is a written page (12A) of General Cross Reference (124) exhibiting the following: Normal Flora Commensals (124A), Skin (124AA), Nose (124AB), Mouth/Throat (124AC), Teeth/Gingiva (124AD), Stomach (124AE), Intestines (124AF), Vagina (124AG), Causes of Menningitis (124B), Aseptic Viral Cause of Menningitis (124BA), Bacterial Cause of Menningitis

11

(124BB), Neonatal Cause of Menningitis(124BC), Immunocompromised Cause of Menningitis (124BD), Elderly Cause of Menningitis(124BE), Head Trauma/Surgery Cause of Menningitis(124BF), Chronic Meningitis Cause of Menningitis(124BG), Menningitis CSF Findings (124C), Viral Aseptic Menningitis CSF Findings (124CA), Bacterial Meningitis CSF Findings (124CB), Tuberculous Menningitis CSF Findings (124CC), Crtptococcus Menningitis CSF Findings (124CD), Syphlis Menningitis CSF Findings (124CE), Lyme Disease Menningitis CSF Findings (124CF), Nuchal Signs (124D), Menningitis Treatment (124E), Viral Aseptic Menningitis Treatment (124EA), NeonatalBacteria Menningitis Treatment (124EB), Bacteria Menningitis Treatment (124EC), Meningitis Prophylaxis (124ED), Meningitis Prevention (124EE), Pneumonia (124F), Community Acquired Pneumonia (124FA), Atypical interstitial Pneumonia (124FB), Immunocompromised Pneumonia (124FC), AIDS Pneumonia (124FD), and Cystic Fibrosis Pneumonia (124FE).

Referring to FIG. 7 which is a written page (12A) of Index and list of abbreviations (126) exhibiting all of the items described herein above listed in alphabetical order.

It will be understood that each of the elements described above, or two or more together, may also find a useful application in other types of constructions differing from the type described above.

While the invention has been illustrated and described as embodied in apparatus to review clinical microbiology, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so filly reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus to review clinical microbiology (10) comprising:
   A) at most two pages each of which contains information about a microorganism, and each of which is selected from a group consisting of at least one written page (12A) and at least one blank page (12B) alternating in sequence with the at least one written page (12A), and at least one one-half written page (12A) comprising one-half blank page (12B) thereon, the blank page (12B) functions as a tablet for a user to write notes thereon, the blank page (12B) further functions to prevent the user from being distracted by information contained on a following written page (12A);
   B) a plurality of sections (16) presented on the written pages (12A);
   C) at least one category (14) is presented within each of the plurality of sections (16), each of the at least one category (14) having at least one microorganism presented therein according to a feature selected from a group of features consisting of disease and common distinguishing, each microorganism is presented individually and entirely on a single written page (12A), each of the at least one category (14) having a color coding (20) functioning as a memory aid for an user;

12

D) at least one chapter (18) is presented within each of the at least one category (14);
E) a cross reference is presented at an end of each of the plurality of categories (16); and
F) a General Cross Reference (124) is presented at the end of the plurality of sections (16).

2. The apparatus to review clinical microbiology (10) as described in claim 1, wherein the plurality of categories (16) are selected from a group consisting of Bacteria (112), Viruses (212) and Prions (312), Fungi (412), Parasites (512), and General Cross Reference (124).

3. The apparatus to review clinical microbiology (10) as described in claim 2, wherein the Bacteria (112) comprise at least one chapter (18) selected from a group consisting of Gram Positive Cocci (112A), Positive Rods and Non-Commensal Anaerobes (112B), Gram Negative Cocci (112C), Gram Negative Rods Respiratory Related (112D), Gram Negative Rods Urinary Tract Related (112E), Gram Negative Rods Gastro-Intestinal Tract Related (112F), Zoonotic Bacteria (112G), Vector-Borne Bacteria (112H), Commensal Anaerobic Bacteria (112I), Gram Positive Acid-Fast and Modified Acid-Fast Bacteria (112J), Spirochetes (112K), Chlamydia (112L), Mycoplasma and Ureaplasma (112M), and Bacteria and Cross Reference (112N).

4. The apparatus to review clinical microbiology (10) as described in claim 2, wherein the Viruses and Prions comprise at least one chapter (18) selected from a group consisting of DNA Viruses (212A), RNA Viruses (212B), Viruses Cross Reference (212C), and Prions (312).

5. The apparatus to review clinical microbiology (10) as described in claim 2, wherein the Fungi comprise at least one chapter (18) selected from a group consisting of Fungi (412), and Fungi Cross Reference (412D).

6. The apparatus to review clinical microbiology (10) as described in claim 2, wherein the Parasites comprise at least one chapter (18) selected from a group consisting of Protozoa parasites (512A), Helminths parasites (512B), Flatworm parasites (512C), Roundworm parasites (512D), and Parasites Cross Reference (512E).

7. The apparatus to review clinical microbiology (10) as described in claim 2, wherein the General Cross Reference comprises a chapter consisting of General Cross Reference (124).

8. The apparatus to review clinical microbiology (10) as described in claim 3, wherein the Gram Positive Cocci (112A) comprise *Staphylococcus aureus* (112AA) having *Staphylococcus aureus* diseases (112AAA), *Staphylococcus epidermidis* (112AB) having *Staphylococcus epidermidis* diseases (112ABA), *Staphylococcus saprophyticus* (112AC) having *Staphylococcus saprophyticus* diseases (112ACA), Staphylococcus Group A (112AD) having Staphylococcus Group A diseases (112ADA), Staphylococcus Group B (112AE) having Staphylococcus Group B diseases (112AEA), *Staphylococcus pneumoniae* (112AF) having *Staphylococcus pneumoniae* diseases (112AFA), Staphylococcus Group D (112AG) having Staphylococcus Group D diseases (112AGA), Staphylococcus Viridans Group (112AH) having Staphylococcus Viridans Group diseases (112AHA), and Enterococcus spp (112AI) having Enterococcus spp diseases (112AJ).

9. The apparatus to review clinical microbiology (10) as described in claim 3, wherein the Positive Rods and Non-Commensal Anaerobes (112B) comprise Bacillus Cereus (112BA) having Bacillus Cereus diseases (112BAA), Corynebacterium Diptheriae (112BB) having Corynebacterium Diptheriae diseases (112BBA), Listeria Monocytogenes (112BC) having Listeria Monocytogenes diseases (112BCA), Clostridium Botulinum (112BD) having Clostridium Botulinum diseases (112BDA), Clostridium Difficile (112BE) having Clostridium Difficile diseases (112BEA), Clostridium Perfringens (112BF) having Clostridium Perfringens diseases (112BFA), and Clostridium Tetani (112BG) having Clostridium Tetani diseases (112BGA).

10. The apparatus to review clinical microbiology (10) as described in claim 3, wherein the Gram Negative Cocci (112C) comprise *Neisseria gonnorrhoeae* (112CA) having *Neisseria gonnorrhoeae* diseases (112CAA), *Neisseria meningitidis* (112CB) having *Neisseria meningitidis* diseases (112CBA), and *Neisseria catarrhalis* (112CC) having *Neisseria catarrhalis* diseases (112CCA).

11. The apparatus to review clinical microbiology (10) as described in claim 3, wherein the Gram Positive Acid-Fast and Modified Acid-Fast Bacteria (112J) comprise Tuberculosis Bacterium (112JA) having *Mycobacterium tuberculosis* (112JAA) and *Mycobacterium bovis* (112JAB), Non-Tuberculosis Bacterium (112JB) having *Mycobacterium kansasii* (112JBA) and *Mycobacterium marinum* (112JBB) and *Mycobacterium scrofulaceum* (112JBC) and MAC (112JBD) and *Mycobacterium smegmatis* (112JBE) and *Mycobacterium abscessus* (112JBF) and *Mycobacterium chelonei* (112JBG) and *Mycobacterium fortuitum* (112JBH), Modified Acid-Fast Bacterium (112JC) having *Nocardia asteroides* (112JCA), and Leprosy Bacterium (112JD) having *Mycobacterium leprae* (112JDA).

12. The apparatus to review clinical microbiology (10) as described in claim 2, wherein the Prions (312) comprise non-DNA non-RNA Protein particles (312A) and prion diseases (314) having prion disease name (314A) selected from a group consisting of description of prion disease name (314AA), transmission of prion disease name (314AB), warnings of prion disease name (314AC), diagnosis of prion disease name (314AD), and treatment of prion disease name (314AE).

13. The apparatus to review clinical microbiology (10) as described in claim 12, wherein the Prions (312) further comprise prion pathological changes (316), prion resistance (318), prion infection (320) and prion description (322).

14. The apparatus to review clinical microbiology (10) as described in claim 2, wherein the Fungi (412) comprise organisims of fungi (412A) having dermatophyte organisims of fungi (412AA) and superficial organisims of fungi (412AB) and mucormycosis organisims of fungi (412AC), genera of fungi (412B), and species of fungi (412C).

15. The apparatus to review clinical microbiology (10) as described in claim 5, wherein the Fungi Cross Reference (412D) comprises Fungi Cross Reference intracellular (412DA), Fungi Cross Reference India Ink Stain (412DB), Fungi Cross Reference chlamydospores (412DC), Fungi Cross Reference germ tubes (412DD), Fungi Cross Reference dimorphic (412DE), Fungi Cross Reference mold only (412DF), Fungi Cross Reference yeast only (412DG), Fungi Cross Reference non-septated hyohi (412DH), Fungi Cross Reference pseudo-hyphi (412DI), Fungi Cross Reference chlamydospores (412DJ), Fungi Cross Reference toxin producing (412DK), Fungi Cross Reference football-shape condia (412DL), Fungi Cross Reference daisey-shaped condia (412DM), Fungi Cross Reference cigar-shaped yeast (412DN), Fungi Cross Reference cigar-shaped yeast (412DO), Fungi Cross Reference multinucleated yeast (412DP), Fungi Cross Reference sherule yeast (412DQ), Fungi Cross Reference multi-budding yeast (412DR), Fungi Cross Reference encapsulated yeast (412DS), Fungi Cross Reference animal related (412DS), and Fungi Cross Reference skin tests (412DU).

16. The apparatus to review clinical microbiology (10) as described in claim 15, wherein the Fungi Cross Reference (412D) further comprises fungi category (414), route of infection of fungi (416), disease of fungi (418), transmission of fungi (420), diagnosis of fungi (422), treatment of fungi (424), warning of fungi (426).

17. The apparatus to review clinical microbiology (10) as described in claim 4, wherein the Viruses Cross Reference (212C) comprises classification of virus (214) which comprises family of virus (214A) having parvovirus family (214AA), genera of virus (214B) having parvovirus genera (214BA), species of virus (214C) having B19 species (214CA), type of virus genome (216), shape of envelope (218), envelope (220), location of replication (222), effect on host cell (224), special facts (226), pathogenesis (228), disease of virus (230), transmission of virus (232), geographic range of virus (234), diagnosis of virus (236), treatment of virus (238), immunity of virus (240), vaccine of virus (242), prevention of virus (244), segmentation (246), neucleocapsid (248), note (250), unique effect on host cell (252), and special characteristics of virus (254).

18. The apparatus to review clinical microbiology (10) as described in claim 17, wherein the type of virus genome (216) is selected from a group consisting of single stranded linear DNA (216A), double stranded linear DNA (216B), double stranded circular DNA (216C), and partial double stranded circular DNA (216D).

19. The apparatus to review clinical microbiology (10) as described in claim 6, wherein the Protozoa parasites (512A) comprise Ameba parasites (512AA), Sporozoan parasites (512AB), Flagellate parasites (512AC), and Pneumocystis parasites (512AD).

20. The apparatus to review clinical microbiology (10) as described in claim 6, wherein the Flatworm parasites (512C) comprise Fluke parasites (512CA) having Schistosomiasis (512CAA) and Liver Fluke (512CAB) and Lung Fluke (512CAC) and Fluke features (512CAD), as well as Tapeworm parasites (512CB) having Pork Tapeworm (512CBA) and Beef Tapeworm (512CBB) and fish Tapeworm (512CBC) and Hydatid Cysts (512CBD) and Tapeworm Features (512CBE).

21. The apparatus to review clinical microbiology (10) as described in claim 6, wherein the Roundworm parasites (512D) comprise Intestinal Nematodes (512DA), Extraintestinal Larvae (512DB), and Tissue Nematodes (512DC).

22. The apparatus to review clinical microbiology (10) as described in claim 6, wherein the Parasites Cross Reference (512E) comprise Intracellular (512EA), Temperature Tropism (512EB), Acid-Fast (512EC), Megaloblastic Anemia (512ED), Infect Through Skin (512EE), Swimming-Related (512EF), Human Dead-End Host (512EG), Snail-Related (512EH), Seafood-Related (512EI), Copepod-Related (512EJ), Cat-Related (512EK), Dog-Related (512EL), Inhalation Route (512EM), and Vector-Borne (512EN).

23. The apparatus to review clinical microbiology (10) as described in claim 2, wherein the Parasites (512) further comprise Genus of Parasite (512F), Species of Parasite (512G), parasite infection (512H), parasite symptoms (5121), parasite Life Cycle (512J), parasite found in (512K), parasite diagnosis (512L), and parasite treatment (512M).

24. The apparatus to review clinical microbiology (10) as described in claim 1, wherein the General Cross Reference (124) comprises Normal Flora Commensals (124A) which comprises Skin (124AA) and Nose (124AB) and Mouth/Throat (124AC) and Teeth/Gingiva (124AD) and Stomach (124AE) and Intestines (124AF) and Vagina (124AG), Causes of Menningitis (124B) which comprises Aseptic Viral Cause of Menningitis (124BA) and Bacterial Cause of Menningitis (124BB) and Neonatal Cause of Menningitis (124BC) and Immunocompromised Cause of Menningitis (124BD) and Elderly Cause of Menningitis (124BE) and Head Trauma/Surgery Cause of Menningitis (124BF) and Chronic Meningitis Cause of Menningitis (124BG). Menningitis CSF Findings (124C) which comprises Viral Aseptic Menningitis CSF Findings (124CA) and Bacterial Menningitis CSF Findings (124CB) and Tuberculous Menningitis CSF Findings (124CC) and Crtptococcus Menningitis CSF Findings (124CD) and Syphlis Menningitis CSF Findings (124CE) and Lyme Disease Menningitis CSF Findings (124CF). Nuchal Signs (124D). Menningitis Treatment (124E) which comprises Viral Aseptic Menningitis Treatment (124EA) and NeonatalBacteria Menningitis Treatment (124EB) and Bacteria Menningitis Treatment (124EC) and Meningitis Prophylaxis (124ED) and Meningitis Prevention (124EE), and Pneumonia (124F) which comprises Community Acquired Pneumonia (124FA) and Atypical interstitial Pneumonia (124FB) and Immunocompromised Pneumonia (124FC) and AIDS Pneumonia (124FD) and Cystic Fibrosis Pneumonia (124FE).

25. The apparatus to review clinical microbiology (10) as described in claim 1 further comprises an Index and list of abbreviations (126).

26. The apparatus to review clinical microbiology (10) as described in claim 3. wherein the Gram Positive Cocci (112A). the Positive Rods and Non-Commensal Anaerobes (112B). the Gram Negative Cocci (112C), the Gram Negative Rods Respiratory Related (112D). the Gram Negative Rods Urinary Tract Related (112E). the Gram Negative Rods Gastro-Intestinal Tract Related (112F). the Zoonotic Bacteria (112G). the Vector-Borne Bacteria (112H). the Commensal Anaerobic Bacteria (112I). the Gram Positive Acid-Fast and Modified Acid-Fast Bacteria (112J). the Spirochetes (112K). the Chlamydia (112L), the Mycoplasma and Ureaplasma (112M). the DNA Viruses (212A). the RNA Viruses (212B). the Prions (312), the Fungi (412). the Protozoa parasites (512A). and the Helminths parasites (512B) are colored selected from a group of colors consisting of primary, florescent, and pastel.

27. The apparatus to review clinical microbiology (10) as described in claim 26, wherein the selected colors are blue for the Gram Positive Cocci (112A). blue for the Positive Rods and Non-Commensal Anaerobes (112B). red for the Gram Negative Cocci (112C), red for the Gram Negative Rods Respiratory Related (112D), red for the Gram Negative Rods Urinary Tract Related (112E). red for the Gram Negative Rods Gastro-Intestinal Tract Related (12F). blue for the gram positive Zoonotic Bacteria (112G) and red for the gram negative Zoonotic Bacteria (112G). red for the gram negative Vector-Borne Bacteria (112H) and blue for the gram positive Vector-Borne Bacteria (112H). blue for the gram positive Commensal Anaerobic Bacteria (112I) and red for the gram negative Commensal Anaerobic Bacteria (112I). red for the Gram Positive Acid-Fast and Modified Acid-Fast Bacteria (112J). green for the Spirochetes (112K). black for the Chlamydia (112L). black for the Mycoplasma and Ureaplasma (112M). blue for the DNA Viruses (212A). red for the RNA Viruses (212B). black for the Prions (312). green for the Fungi (412). red for the Protozoa parasites (512A). and the blue for the Helminths parasites (512B).

28. The apparatus to review clinical microbiology (10) as described in claim 3, wherein each Bacteria (112) is displayed exhibiting genus and species on a written page (12A) which further exhibits: Gram stain (114), oxygen requirement (118), cellular growth (120), features (122), motility (124), capsule & glycocalyx (126), toxins (128), clinical (130), source & transmission (132), virulence factors (134), treatment (136), vaccine and toxoid (138), host defense & immunity (140), and lab tests (142), as well as drawings or photo reproduction of the Bacteria (112), and the sum of the exhibts of the microorganism depicted.

29. The apparatus to review clinical microbiology (10) as described in claim 3, wherein each Bacteria (112) is pesented in a graphic layout, and the graphic layout is used to present viruses, prions, fungi, and parasites.

30. The apparatus to review clinical microbiology (10) as described in claim 1, wherein the apparatus is presented in printed form, or via electronic communication means.

* * * * *